United States Patent [19]
Fujikake et al.

[11] Patent Number: 5,629,395
[45] Date of Patent: May 13, 1997

[54] PROCESS FOR PRODUCING CROSS-LINKED POLYMER CONTAINING CARBOXYL GROUP

[75] Inventors: Masato Fujikake; Shinji Kobayashi; Shigeki Hamamoto; Mitsutaka Tabata; Morio Nakamura, all of Himeji, Japan

[73] Assignee: Sumitomo Seika Chemicals Co., Ltd., Hyogo, Japan

[21] Appl. No.: 621,513

[22] Filed: Mar. 25, 1996

Related U.S. Application Data

[63] Continuation of Ser. No. 444,726, May 19, 1995, abandoned, which is a continuation of Ser. No. 125,817, Sep. 24, 1993, abandoned.

[30] Foreign Application Priority Data

Oct. 1, 1992 [JP] Japan .................................... 4-263466

[51] Int. Cl.⁶ ......................................................... C08F 2/06
[52] U.S. Cl. .................. 526/238.23; 526/193; 526/317.1; 526/318.3; 526/318.6
[58] Field of Search .............................. 526/238.23, 193, 526/279, 317.1, 318.3, 318.6

[56] References Cited

U.S. PATENT DOCUMENTS

| | | | |
|---|---|---|---|
| 2,923,692 | 2/1960 | Ackerman et al. | 524/548 |
| 2,958,679 | 11/1960 | Jones | 526/256 |
| 3,426,004 | 2/1969 | Wagner et al. | 526/274 |
| 4,267,365 | 5/1981 | Findeisen | 522/317.1 |
| 4,748,220 | 5/1988 | Hartmann et al. | 526/89 |

FOREIGN PATENT DOCUMENTS

| | | |
|---|---|---|
| 2239035 | 9/1987 | European Pat. Off. . |
| 343490 | 11/1989 | European Pat. Off. . |
| 2017451 | 10/1971 | Germany . |
| 4127814 | 3/1992 | Germany . |
| 58-084819 | 5/1983 | Japan . |

OTHER PUBLICATIONS

Chemical Abstracts 99:123553j – Abstract of JP–58 84,819.

*Primary Examiner*—Jeffrey T. Smith

[57] ABSTRACT

There is provided an industrially advantageous process for producing a crosslinked polymer containing carboxyl groups which comprises (a) polymerizing an α,β-unsaturated carboxylic acid and a crosslinking agent copolymerizable with it in the presence of a radical polymerization catalyst in an inert solvent, (b) heating the polymerized product in the presence of a radical scavenger and (c) removing the solvent. The polymer dissolved in water has high viscosity and excellent flowing properties.

5 Claims, No Drawings

PROCESS FOR PRODUCING CROSS-LINKED POLYMER CONTAINING CARBOXYL GROUP

This application is a continuation of application Ser. No. 08/444,726, filed May 19, 1995 now abandoned which, in turn, is a continuation of application Ser. No. 08/125,817, filed Sep. 24, 1993 now abandoned.

FIELD OF THE INVENTION

The present invention relates to a process for producing a powdered crosslinked polymer containing carboxyl groups which is suitable for using as a thickener of various aqueous solutions.

BACKGROUND OF THE INVENTION

Powdered crosslinked polymers containing carboxyl groups (hereinafter sometimes referred to as crosslinked polymers) are characterized in that they dissolve in water and exhibit extremely high viscosity even in low concentrations by neutralizing them with appropriate bases and form plastic fluid with a high yield value. They have been used in various fields on the basis of these special flowing properties. For example, they have been used in the industrial fields as solid suspension stabilizers (e.g., gypsum, cement, etc.), thickeners (e.g., water-soluble paint, emulsion paint, etc.), pastes (e.g., printing paste in the textile industry, etc.); in the field of cosmetics and toiletries in cream, lotion, shampoo, dentifrice on the basis of thickening and suspension stabilizing properties; and in the pharmaceutical field in ointments, tablets or the like.

Such crosslinked polymers have been produced by known methods, for example, by copolymerization of an $\alpha,\beta$-unsaturated carboxylic acid such as acrylic acid and a monomer having at least two ethylenic unsaturated groups such as polyallyl ether of sucrose (U.S. Pat. No. 2,923,692), hexaallyltrimethylene trisulfone (U.S. Pat. No. 2,958,679), triallyl phosphate (U.S. Pat. No. 3,426,004) or the like; or by copolymerization of an $\alpha,\beta$-unsaturated carboxylic acid such as acrylic acid and a polymerizable monomer having a glycidyl group such as glycidyl methacrylate (JP-A 58-84819) or the like, followed by heating. The crosslinked polymers obtained by these prior art methods do not have satisfactory properties.

On the other hand, when these crosslinked polymers are used as a thickener for various solutions, the higher the viscosity the crosslinked polymers exhibit, the more various uses they have. Further, desired thickening effects can be obtained even by using a smaller amount of them. The crosslinked polymers thus have high value as goods.

OBJECTS OF THE INVENTION

The main object of the present invention is to provide an industrially advantageous process for producing a crosslinked polymer containing carboxyl groups having high viscosity and excellent flowing properties.

This object as well as other objects and advantages of the present invention will become apparent to those skilled in the art from the following description.

SUMMARY OF THE INVENTION

Under these circumstances, the present inventors have intensively studied processes for producing crosslinked polymers containing carboxyl groups which have high viscosity and excellent flowing properties in comparison with known crosslinked polymers. As a result, it has been found that a crosslinked polymer having the above excellent viscosity properties can be obtained by (a) polymerization in an inert solvent, (b) heating the resulting slurry in the presence of a radical scavenger, and then (c) removing the solvent. Thus, the present invention has been completed.

That is, according to the present invention, there is provided a process for producing a crosslinked polymer containing carboxyl groups which comprises (a) polymerizing an $\alpha,\beta$-unsaturated carboxylic acid and a crosslinking agent copolymerizable with it in the presence of a radical polymerization catalyst in an inert solvent, (b) heating the polymerized product in the presence of a radical scavenger and (c) removing the solvent.

DETAILED DESCRIPTION OF THE INVENTION

The inert solvent which can be used in the invention is that which dissolves the monomer but does not dissolve the polymer obtained. Examples of the inert solvent include halogenated hydrocarbons (e.g., ethylene dichloride, chlorobenzene, etc.), aliphatic hydrocarbons (e.g., n-pentane, n-hexane, isohexane, n-heptane, n-octane, isooctane, etc.), alicyclic hydrocarbons (e.g., cyclopentane, methylcyclopentane, cyclohexane, methylcyclohexane, etc.) and aromatic hydrocarbons (e.g., benzene, toluene, xylene, etc.) and the like. Among these inert solvents, ethylene dichloride, benzene and n-hexane are advantageously used because they have stable quality and are readily available.

As examples of the $\alpha,\beta$-unsaturated carboxylic acid to be used in the invention, there are acrylic acid, methacrylic acid, crotonic acid, maleic acid, itaconic acid, fumaric acid and other olefinic unsaturated carboxylic acids. These $\alpha,\beta$-unsaturated carboxylic acids can be used alone or as a mixture of two or more of them. Among them, acrylic acid is particularly preferred because it is cheap and readily available and gives polymers with excellent properties.

The radical polymerization catalyst is suitably $\alpha,\alpha'$-azobisisobutyronitrile, 2,2'-azobis-2,4-dimethylvaleronitrile, dimethyl-2,2'-azobisisobutyrate, benzoyl peroxide, lauroyl peroxide, cumene hydroperoxide, tert-butyl hydroperoxide peroxide or the like. The amount of the radical polymerization catalyst to be used varies depending upon the kind and the temperature in its use. It is normally used in an amount of 0.1 to 10% by weight, preferably 0.3 to 3% by weight based on the total amount of the $\alpha,\beta$-unsaturated carboxylic acid and the crosslinking agent. When the catalyst is used in excess, the polymerization proceeds extremely rapidly and removal of the reaction heat becomes difficult, and it is difficult to maintain the desired reaction temperature. When the amount of the catalyst to be used is too small, the polymerization is not economically performed because the reaction rate becomes too low.

Any crosslinking agent may be used in the invention so long as it is a monomer having at least two ethylenic unsaturated groups or a monomer having at least one epoxy group and at least one ethylenic unsaturated group and it dissolves in the above solvent. Examples of the crosslinking agents include acrylic acid esters of polyols, methacrylic acid esters of polyols and allyl ethers of polyols each of which has hydroxyl groups substituted with at least two substituents. Examples of the above polyols include ethylene glycol, propylene glycol, polyoxyethylene glycol, polyoxypropylene glycol, glycerin, polyglycerin, trimethylolpropane, pentaerythritol, sucrose, sorbitol and the like. In addition, the crosslinking agents include diallyl phthalate, triallyl phosphate, allyl methacrylate, tetraallyloxyethane, triallyl cyanurate, divinyl adipate, vinyl crotonate, 1,5-hexadiene, divinylbenzene, glycidyl methacrylate, allyl glycidyl ether and the like. Among them, pentaerythritol tetraallyl ether, polyallylsucrose, triallyl phosphate or tetraallyloxyethane give more preferred results.

Of course, the thickening properties of the cross-linked polymer vary depending upon the kind of crosslinking agent and other conditions. The amount of the monomer having at least two ethylenic unsaturated groups or the monomer having at least one epoxy group and at least one ethylenic unsaturated group is in the range of 0.05 to 10% by weight, preferably 0.1 to 3% by weight based on the $\alpha,\beta$-unsaturated carboxylic acid. The optimum amount to be added is determined in view of various conditions. When the crosslinking agent is added in excess, three-dimensional polymers are formed in large amounts and insoluble gels are sometimes formed. When the amount added is too small, the crosslinking agent does not exhibit its effect and gives liquid properties similar to those in the case of no addition of it.

Any radical scavenger can be used in the invention so long as it is capable of inhibiting radical chain reaction. Examples thereof include hydroquinone, methylhydroquinone, methoxyhydroquione, 2,5-di-tert-butylhydroquinone, catechol, pyrogallol, resorcin, methyl p-hydroxybenzoate, dibutylhydroxytoluene, butylhydroxyanisole, oxygen and the like. When dibutylhydroxytoluene, butylhydroxyanisole, methoxyhydroquinone or oxygen is used, preferred results are obtained.

When oxygen is used, it must be used in an oxygen concentration below the limit of inflammability of the inert solvent. Oxygen gas diluted with nitrogen gas to a given concentration is, therefore, bubbled into the resulting slurry. The oxygen concentration in the gas to be used is preferably from 1% oxygen by volume to the limit oxygen concentration of inflammability of the inert solvent. When the oxygen concentration is below 1% by volume, pronounced effects are not obtained.

When radical scavengers other than oxygen are used, the amount to be used varies depending upon the kind of radical scavenger and other conditions and is in the range of 0.05 to 5% by weight, preferably 0.1 to 2% by weight based on the $\alpha,\beta$-unsaturated carboxylic acid. When the amount is too small, no effect is obtained.

These radical scavengers may be added in a given amount just before the drying step to the slurry formed after completion of the polymerization, or may be added successively in the drying step.

On the other hand, when oxygen is used, the heating and drying are carried out while bubbling oxygen diluted to a given concentration with nitrogen into the slurry. Thus, good results are obtained.

The mechanism of action is not clear in detail by which the use of a radical scavenger gives polymers having the desired effects, namely polymers which have excellent suspension stabilizing effect and are suitable for use as a thickening agent. It is speculated, however, that formation of a low molecular weight polymer, during the drying step, resulting from reacting the trace amount of $\alpha,\beta$-unsaturated carboxylic acid and crosslinking agent both remaining in the slurry after completion of the polymerization is inhibited by the radical scavenger. Also, the formation of excessively crosslinked polymer is inhibited as well. As a result, the moderately crosslinked polymer can be obtained in high purity without formation of low molecular weight polymers.

In the present invention, the crosslinked polymer are prepared as follows.

The $\alpha,\beta$-unsaturated carboxylic acid, crosslinking agent, polymerization catalyst and solvent are placed in a reaction vessel equipped with a stirrer, thermometer, inlet pipe of nitrogen and cooling pipe. In this case, the amount of the raw material (i.e., all materials other than solvent) for the polymerization is suitably in the range of not more than 20% by weight, preferably 5 to 15% by weight based on the total weight of the above materials to be used. When it exceeds 20% by weight, a large amount of deposit of the polymer forms as the polymerization proceeds, and, at the same time, stirring the reaction mixture homogeneously becomes difficult. When it is less than 5% by weight, the preparation is not economically performed.

Then, nitrogen gas is bubbled into the solution to remove oxygen in the upper part in the reaction vessel and oxygen dissolved in the raw material (i.e., all materials other than solvent) and solvent. The polymerization reaction is initiated by heating on a warm bath or the like to a given temperature in the range of 20° to 120° C., preferably 30° to 90° C. The reaction system changes from the initial homogeneous solution to a white slurry.

Further, separately from the above method, the crosslinking agent can be added successively to the polymerization system as the polymerization of the $\alpha,\beta$-unsaturated carboxylic acid proceeds.

After completion of the polymerization, the inert solvent is removed by drying under heating at 50° C. to 160° C., preferably 70° C. to 130° C. while bubbling nitrogen gas containing oxygen into the resulting slurry, or after adding a radical scavenger other than oxygen.

When the heating temperature is lower than 50° C., it takes long to remove the solvent. A heating temperature of higher than 160° C. is not preferred because the desired polymer cannot be obtained economically and heat deterioration of the polymer is caused.

The crosslinked polymer obtained by the above method is dissolved in a large amount of water, and the carboxyl groups in the polymer are neutralized with an appropriate base to pH 7. Thereby the aqueous solution exhibits maximum viscosity. The desired viscosity can be obtained by using the crosslinked polymer in a concentration of only not more than 1% in water. This prominent thickening effect is an important characteristic of the polymer of the present invention.

As the neutralizing agent, any known base can be used. For example, there can be used inorganic bases such as sodium hydroxide, potassium hydroxide, sodium carbonate, potassium carbonate, ammonium hydroxide and the like as well as organic bases such as triethanolamine, triethylamine and the like.

As described hereinabove, according to the present invention, there is provided an industrially advantageous process for producing a polymer which has high viscosity and excellent flowing properties in comparison with known crosslinked polymers containing carboxyl groups and has various uses. The present invention contribute largely to development of industry.

The following examples further illustrate the present invention in detail but are not to be construed to limit the scope thereof.

EXAMPLE 1

Crosslinked polymer of acrylic acid was prepared by using ethylene dichloride as the inert solvent, azobisisobutyronitrile (hereinafter referred to as AIBN) as the radical polymerization catalyst, pentaerythritol tetraallyl ether in varying amounts as the crosslinking agent.

The above solvent was previously placed in a 500 ml four necked flask, and then the following amounts of the α,β-unsaturated carboxylic acid, crosslinking agent and radical polymerization catalyst were added and polymerization was carried out.

| Acrylic acid | 30 g |
|---|---|
| Pentaerythritol tetraallyl ether (*1) | 0.42, 0.45, 0.48 g |
| AIBN | 0.1 g |
| Ethylene dichloride | 340 ml |

(*1) Synthesized according to U.S. Pat. No. 3,428,693.

The reaction was carried out for 3 hours with stirring at 55° C. to 65° C. under an atmosphere of nitrogen, and the reaction mixture was maintained for 30 minutes under reflux of ethylene dichloride.

Then, while bubbling nitrogen gas containing oxygen (oxygen concentration: 3% by volume) at a flow rate of 20 ml/min into the slurry formed after completion of the polymerization reaction, the slurry was heated to about 110° C. and maintained for 30 minutes, further continued heating to dryness.

Thus, the crosslinked polymer (about 30 g) of acrylic acid was obtained in the form of white fine powders. Table 1 shows the viscosity of a 0.5% by weight aqueous solution of the crosslinked polymer.

(Measurement of the viscosity)

The above crosslinked polymer of acrylic acid was dispersed in an ion-exchange water and neutralized to pH 7 with an aqueous solution of sodium hydroxide to prepare a viscous aqueous solution of a concentration of 0.5% by weight. The viscosity of this solution was measured with Brookfield type viscometer at 25° C. and 20 rpm.

TABLE 1

| Example 1 | Crosslinking agent | Amount added (g) | Viscosity (CPS) |
|---|---|---|---|
| (A) | Pentaerythritol tetraallyl ether | 0.42 | 45000 |
| (B) | Pentaerythritol tetraallyl ether | 0.45 | 50000 |
| (C) | Pentaerythritol tetraallyl ether | 0.48 | 51000 |

Comparative Examples 1 to 2

Crosslinked polymer of acrylic acid was prepared using nitrogen gas (purity: 99.99%) instead of nitrogen gas containing oxygen (oxygen concentration: 3% by volume) bubbled into the resulting slurry during the heating and drying.

Under the same conditions as those in Example 1(A) and (B) except that nitrogen gas (purity: 99.99%) was used in each case instead of using the gas bubbled into the formed slurry during the heating and drying, polymerization was carried out to obtain the crosslinked polymer in the form of white fine powders. The viscosity of the resulting polymer corresponding to that of Example 1(A) and (B) was 33000 CPS and 38000 CPS, respectively.

EXAMPLE 2

Crosslinked polymer of acrylic acid was prepared by using n-hexane as the inert solvent, AIBN as the radical polymerization catalyst, pentaerythritol tetraallyl ether in varying amounts as the crosslinking agent.

The above solvent was previously placed in a 500 ml four necked flask, and then the following amounts of α,β-unsaturated carboxylic acid, crosslinking agent and radical polymerization catalyst were placed and the polymerization was carried out.

| Acrylic acid | 30 g |
|---|---|
| Pentaerythritol tetraallyl ether | 0.24, 0.27, 0.30 g |
| AIBN | 0.2 g |
| n-Hexane | 340 ml |

The reaction was carried out for 3 hours with stirring at 55° C. to 65° C. under an atmosphere of nitrogen, and the reaction mixture was maintained for 30 minutes under reflux of n-hexane.

Then, while bubbling nitrogen gas containing oxygen (oxygen concentration: 3% by volume) at a flow rate of 20 ml/min into the slurry formed after completion of the polymerization reaction, the slurry was heated to about 110° C. and maintained for 30 minutes, further continued heating to dryness.

Thus, the crosslinked polymer (about 30 g) of acrylic acid was obtained in the form of a white fine powder. Table 2 shows the viscosity of a 0.5% by weight aqueous solution of the crosslinked polymer.

TABLE 2

| Example 2 | Crosslinking agent | Amount added (g) | Viscosity (CPS) |
|---|---|---|---|
| (A) | Pentaerythritol tetraallyl ether | 0.24 | 47000 |
| (B) | Pentaerythritol tetraallyl ether | 0.27 | 55000 |
| (C) | Pentaerythritol tetraallyl ether | 0.30 | 52000 |

Comparative Examples 3 to 4

Crosslinked polymer of acrylic acid was prepared using nitrogen gas (purity: 99.99%) instead of the nitrogen gas containing oxygen (oxygen concentration: 3% by volume) bubbled into the resulting slurry during the heating and drying.

Under the same conditions as those in Example 2(A) and (B) except that nitrogen gas (purity: 99.99%) was used in each case instead of using the gas bubbled into the formed slurry during the heating and drying, polymerization was carried out to give the crosslinked polymer in the form of white fine powders. The viscosity of the resulting polymer corresponding to that of Example 2(A) and (B) was 29000 CPS and 33000 CPS, respectively.

EXAMPLE 3

Polymerization was carried out under the same conditions as those in Example 2(B). While bubbling nitrogen gas containing varying amounts of oxygen into the resulting slurry, the slurry was heated to about 90° C. and maintained for 30 minutes, further continued heating for drying to give crosslinked polymer of acrylic acid in the form of white fine powder.

Table 3 shows the viscosity of the aqueous solution (0.5% by weight).

TABLE 3

| Example 3 | Oxygen/Nitrogen volume ratio | Viscosity (CPS) |
|---|---|---|
| (A) | 1/99 | 48000 |
| (B) | 3/97 | 55000 |
| (C) | 5/95 | 56000 |

EXAMPLE 4

Polymerization was carried out under the same conditions as those in Example 2(B). Different kinds of radical scavengers (each 0.2 g) were added to the resulting slurry. Then, while bubbling nitrogen gas (purity: 99.99%), the slurry was heated at 110° C. and maintained for 30 minutes, further continued heating for drying to give crosslinked polymer of acrylic acid in the form of white fine powders Table 4 shows the viscosity of the aqueous solution (0.5% by weight).

TABLE 4

| Example 4 | Radical scavenger | Amount added (g) | Viscosity (CPS) |
|---|---|---|---|
| (A) | Methoxy-hydroquinone | 0.2 | 51000 |
| (B) | Dibutyl-hydroxytoluene | 0.2 | 47000 |
| (C) | p-tert-butyl-catechol | 0.2 | 50000 |

EXAMPLE 5

Polymerization was carried out under the same conditions as those in Example 2 by using n-heptane as the inert solvent and using tetraallyloxyethane as the cross-linking agent.

Then methoxyhydroquinone in varying amounts was added to the resulting slurry. While bubbling nitrogen gas (purity: 99.99%), the slurry was heated to 110° C. and maintained for 30 minutes, further continued heating for drying to give crosslinked polymer of acrylic acid in the form of white fine powders.

| Acrylic acid | 30.0 g |
|---|---|
| Tetraallyloxyethane | 0.27 g |
| AIBN | 0.2 g |
| n-Heptane | 340 ml |

Table 5 shows the viscosity of the aqueous solution (0.5% by weight).

TABLE 5

| Example 5 | Radical scavenger | Amount added (g) | Viscosity (CPS) |
|---|---|---|---|
| (A) | Methoxy-hydroquinone | 0.02 | 40000 |
| (B) | Methoxy-hydroquinone | 0.1 | 46700 |
| (C) | Methoxy-hydroquinone | 0.3 | 47200 |

Comparative Example 5

Polymerization was carried out under the same conditions as those in Example 5. According to the same manner as that in Example 5 except without adding methoxyhydroquinone to the resulting slurry, the resulting slurry was heated for heating and drying to give crosslinked polymer of acrylic acid in the form of a white fine powder.

The viscosity of an aqueous solution (0.5% by weight) of the resulting polymer was 28000 CPS.

EXAMPLE 6

Crosslinked polymer of acrylic acid was prepared by using n-hexane as the inert solvent, AIBN as the radical polymerization catalyst, and polyallylsucrose as the crosslinking agent.

n-Hexane (320 ml) was previously placed in a 500 ml four necked flask. Then, acrylic acid (30 g) and AIBN (0.2 g) were added. Polymerization was carried out at 60° C.

After initiation of the polymerization, a mixed solution composed of polyallylsucrose (0.36 g) and n-hexane (20 ml) was added dropwise over about 3 hours. The polymerization was continued for 1 hour after that. Then the mixture was maintained under reflux of n-hexane for 30 minutes.

Then, while bubbling nitrogen gas containing oxygen (oxygen concentration: 3% by volume) at a flow rate of 20 ml/min into the slurry formed after completion of the polymerization reaction, the slurry was heated to about 110° C. and maintained for 30 minutes, further continued heating for drying to give the crosslinked polymer in the form of white fine powders. The viscosity of an aqueous solution (0.5% by weight ) of the polymer was 39000 CPS.

Comparative Example 6

Crosslinked polymer of acrylic acid was prepared using nitrogen gas (purity: 99.99%) instead of the nitrogen gas containing oxygen (oxygen concentration: 3% by volume) bubbled into the resulting slurry during the heating and drying.

Under the same conditions as those in Example 6 except that nitrogen gas (purity: 99.99%) was used instead of using the gas bubbled into the formed slurry during the heating and drying, polymerization was carried out to give the crosslinked polymer in the form of a white fine powder. The viscosity of an aqueous solution (0.5% by weight) of the polymer was 22000 CPS.

What is claimed is:

1. A process for producing a water-soluble crosslinked polymer containing carboxyl groups which comprises (a) polymerizing an α,β-unsaturated carboxylic acid and a crosslinking agent copolymerizable with it in the presence of a radical polymerization catalyst in an aliphatic hydrocarbon solvent to form a slurry, and (b) removing aliphatic hydrocarbon solvent by drying under heating at 50° C. to 160° C. while bubbling oxygen gas diluted with nitrogen gas as a radical scavenger into the resulting slurry.

2. A process according to claim 1, wherein the α,β-unsaturated carboxylic acid is acrylic acid.

3. A process according to claim 1, wherein the crosslinking agent is at least one member selected from the group consisting of pentaerythritol tetraallyl ether, tetraallyloxyethane, triallyl phosphate and polyallylsucrose.

4. A process according to claim 1, wherein the radical polymerization catalyst is α,β'-azobisisobutyronitrile.

5. A process according to claim 1, wherein the oxygen concentration is from 1% by volume to the limit oxygen concentration of inflammability of the aliphatic hydrocarbon solvent.

* * * * *

UNITED STATES PATENT AND TRADEMARK OFFICE
CERTIFICATE OF CORRECTION

PATENT NO. : 5,629,395
DATED : May 13, 1997
INVENTOR(S) : Masato Fujikake, et al.

It is certified that error appears in the above-indentified patent and that said Letters Patent is hereby corrected as shown below:

Claim 4 (column 8, line 61), "$\alpha,\beta'$-azobisisobutyronitrile" should be --$\alpha,\alpha'$-azobisisobutyronitrile--.

Signed and Sealed this

First Day of July, 1997

Attest:

BRUCE LEHMAN

Attesting Officer

Commissioner of Patents and Trademarks